United States Patent
Kamiya

[19]

[11] Patent Number: 5,948,053
[45] Date of Patent: Sep. 7, 1999

[54] DIGITAL SIGNAL PROCESSOR ARCHITECTURE USING SIGNAL PATHS TO CARRY OUT ARITHMETIC OPERATIONS

[75] Inventor: Ryo Kamiya, Hamamatsu, Japan

[73] Assignee: Yamaha Corporation, Hamamatsu, Japan

[21] Appl. No.: 08/921,193

[22] Filed: Aug. 29, 1997

[30] Foreign Application Priority Data

Sep. 2, 1996 [JP] Japan .................................. 8-232092
Sep. 2, 1996 [JP] Japan .................................. 8-232093

[51] Int. Cl.⁶ ...................................................... G06F 7/38
[52] U.S. Cl. ........................................... 708/522; 708/523
[58] Field of Search ......................... 364/736.02, 736.06, 364/750.5

[56] References Cited

U.S. PATENT DOCUMENTS

| | | | |
|---|---|---|---|
| 4,541,048 | 9/1985 | Propster et al. | 364/736.04 |
| 5,175,702 | 12/1992 | Beraud | 364/736.02 |
| 5,235,536 | 8/1993 | Matsubishi et al. | 364/750.5 |
| 5,530,661 | 6/1996 | Garbe | 364/750.5 |
| 5,784,306 | 7/1998 | Ogletree | 364/736.02 |

*Primary Examiner*—David H. Malzahn
*Attorney, Agent, or Firm*—Graham & James LLP

[57] ABSTRACT

A digital signal processor has an arithmetic operation device that carries out arithmetic operations. The arithmetic operation device has a plurality of elementary arithmetic operation units. A signal path-forming device forms signal paths for inputting and outputting signals to and from the elementary arithmetic operations units, according to a predetermined program. The arithmetic operation device carries out processing of a digital signal input to the digital signal processor after the signal paths have been formed by the signal path-forming device.

7 Claims, 15 Drawing Sheets

FIG.5

| | RELATIVE ADDRESS OF REGISTER AS SOURCE | MEMORY ADDRESS |
|---|---|---|
| INPUT REGISTER A | OUTPUT DATA FROM m ROWS ABOVE AND n COLUMNS LEFTWARD | |
| INPUT REGISTER B | REGISTER X WITHIN SAME ELEMENTARY UNIT | |
| INPUT REGISTER C | ⋯ | XX |
| LOCAL REGISTER REG0 | ⋯ | |
| LOCAL REGISTER REG1 | ⋯ | |
| LOCAL REGISTER REG2 | ⋯ | | k

FIG.12

|  |  | 0 | 1 | 2 |
|---|---|---|---|---|
| ELEMENTARY UNIT #0 | REGISTER A | | | |
| | REGISTER B | | | |
| | REGISTER C | | | |
| | REGISTER D | | | |
| ELEMENTARY UNIT #1 | REGISTER A | | | |
| | REGISTER B | | | |
| | REGISTER C | | | |
| | REGISTER D | | | |
| ≈ | | ≈ | ≈ | ≈ |
| ELEMENTARY UNIT #15 | REGISTER A | | | |
| | REGISTER B | | | |
| | REGISTER C | | | |
| | REGISTER D | | | |
| GENERAL REGISTER | GR0 | | | |
| | GR1 | | | |
| | GR2 | | | |
| | GR3 | | | |

|  |  | 0 | 1 | 2 |
|---|---|---|---|---|
| ELEMENTARY UNIT #0 | REGISTER A | GR0 | A | A |
|  | REGISTER B | GR1 | E | E |
|  | REGISTER C | GR2 | GR2 | GR2 |
|  | REGISTER D | — | — | — |
| GENERAL REGISTER | GR0 | X | — | — |
|  | GR1 | $a_3$ | — | — |
|  | GR2 | $a_2$ | $a_1$ | $a_0$ |
|  | GR3 | — | — | — |

$E = a_3 X + a_2$

0TH CLOCK $E = (a_3 X + a_2) X + a_1$

1ST CLOCK $E = ((a_3 X + a_2) X + a_1) X + a_0$

2ND CLOCK

FIG.15A

| | | 0 |
|---|---|---|
| ELEMENTARY UNIT #0 | REGISTER A | GR0 |
| | REGISTER B | GR1 |
| | REGISTER C | GR2 |
| | REGISTER D | — |
| ELEMENTARY UNIT #1 | REGISTER A | GR0 |
| | REGISTER B | L(E) |
| | REGISTER C | GR3 |
| | REGISTER D | — |
| ELEMENTARY UNIT #2 | REGISTER A | GR0 |
| | REGISTER B | L(E) |
| | REGISTER C | GR4 |
| | REGISTER D | — |
| GENERAL REGISTER | GR0 | X |
| | GR1 | $a_3$ |
| | GR2 | $a_2$ |
| | GR3 | $a_1$ |
| | GR4 | $a_0$ |

FIG.16

|  |  | INITIALIZATION | 0 |
|---|---|---|---|
| ELEMENTARY UNIT #0 | REGISTER A | — | GR0 |
|  | REGISTER B | GR0 | B |
|  | REGISTER C | GR1 | C |
|  | REGISTER D | — | — |
| ELEMENTARY UNIT #1 | REGISTER A | — | GR0 |
|  | REGISTER B | — | L(E) |
|  | REGISTER C | GR2 | C |
|  | REGISTER D | — | — |
| ELEMENTARY UNIT #2 | REGISTER A | — | GR0 |
|  | REGISTER B | — | L(E) |
|  | REGISTER C | GR3 | C |
|  | REGISTER D | — | — |
| GENERAL REGISTER | GR0 | $a_3$ | x |
|  | GR1 | $a_2$ | — |
|  | GR2 | $a_1$ | — |
|  | GR3 | $a_0$ | — |

DIGITAL SIGNAL PROCESSOR ARCHITECTURE USING SIGNAL PATHS TO CARRY OUT ARITHMETIC OPERATIONS

BACKGROUND OF THE INVENTION

1. Field of the Invention

This invention relates to a digital signal processor for carrying out various kinds of digital signal processing, such as filtering.

2. Prior Art

Recently, various kinds of digital signal processing including filtering are widely carried out in many fields of technology. Most of the various kinds of digital signal processing can be represented by combinations of simple arithmetic operations including a multiplying operation, an adding operation, and a multiplying-adding operation. To carry out such arithmetic operations at high speeds, DSP's (digital signal processors) are widely utilized.

FIG. 1 shows an example of the construction of a DSP of this kind. In FIG. 1, reference numeral 20 designates an arithmetic operation block having a simple circuit configuration in which a multiplier 21, an adder 22, and registers 23 to 26 are connected to each other as shown in the figure. The DSP further includes a RAM (random access memory) 30, a program memory 31, a program counter 32 for supplying a readout address to the program memory, and a decoder 33.

In this DSP, a digital signal to be processed is transferred via the RAM 30 to the arithmetic operation block 20, where digital signal processing is carried out in a predetermined manner, and results of the processing are delivered from the DSP via the RAM 30. As illustrated in the figure, the arithmetic operation block 20 is very simple in construction. To cause the arithmetic operation block 20 to have such a simple construction to carry out digital signal processing, such as filtering, it is required to decompose the digital signal processing into a sequence of simple arithmetic operations each of which can be executed by a hardware resource, such as the multiplier 21, in a single step, and cause the arithmetic operation block 20 to sequentially carry out these arithmetic operations. To this end, a program formed of a sequence of instructions for instructing the above sequence of simple arithmetic operations and the inputting and outputting of signals required for carrying out each arithmetic operation is stored in the program memory 31. When the DSP carries out the digital signal processing, the instructions are sequentially read from the program memory 31 and decoded by the decoder 33 into control signals corresponding respectively to the instructions, which are sequentially supplied to processing elements within the DSP, where arithmetic operations are carried out according to the control signals. Thus, various kinds of digital signal processing including filtering are carried out by the arithmetic operation block 20 having a simple construction.

On the other hand, in addition to the arithmetic operation block having a simple construction, a device has been also proposed in which elements required for executing arithmetic operations constituting digital signal processing, such as multipliers, are separately provided for execution of the arithmetic operations. FIG. 2 shows an example of the construction of a device of this kind, i.e. a transfer filter, which is comprised of a plurality of multipliers 31, 31, . . . , a plurality of adders 32, 32, . . . , and a plurality of registers 33, 33, . . . , for executing high-speed convolution of a digital signal input thereto with a predetermined sequence of coefficients.

The DSP described above carries out the whole digital signal processing by executing a sequence of arithmetic operations in a predetermined order, and therefore, if the number of steps for executing the arithmetic operations forming the digital signal processing is large, it inevitably takes a long time period to obtain results of the arithmetic operations.

Therefore, to increase the speed of processing by the DSP, a pipeline control method has been introduced. The pipeline control method, however, gives rise to another problem. That is, the DSP based on the pipeline control method starts to execute instructions forming a program before execution of respective preceding instructions is completed. Therefore, the user of the DSP or the programmer has to prepare a program by taking into account a time period required for the DSP to execute each instruction, and this makes the operation of preparing a program very troublesome to carry out. Further, even if a program is executed by the pipeline control method, this is not different at all from other conventional methods in that instructions are sequentially executed one by one, so that when the number of steps of the program is large, it takes a long time period to obtain results of the processing.

To solve this kind of problem and at the same time increase the speed of digital signal processing, one will consider it effective to provide the DSP with hardware for executing the digital signal processing, as in the case of the transfer filter. When this technique is employed, however, it is required to develop and manufacture hardware dedicatedly designed for the digital signal processing whenever contents of the digital signal processing are changed, which is very uneconomical.

SUMMARY OF THE INVENTION

It is an object of the invention to provide a digital signal processor which is capable of executing desired contents of digital signal processing at a high speed, thereby having excellent flexibility and high processing speed.

To attain the above object, according to a first object of the invention, there is provided a digital signal processor, comprising an arithmetic operation device that carries out arithmetic operations, the arithmetic operation device having a plurality of elementary arithmetic operation units having an identical construction, each of the elementary arithmetic operation units having a multiplier, an adder and registers, a signal path-forming device that forms signal paths for inputting and outputting signals to and from the elementary arithmetic operation units, according to a predetermined program, the arithmetic operation device carrying out processing of a digital signal input to the digital signal processor after the signal paths have been formed by the signal path-forming device.

Preferably, the digital signal processor includes a memory device that stores the predetermined program, and the signal path-forming device forms the signal paths according to the predetermined program stored in the memory device.

More preferably, the predetermined program comprises an arithmetic operation control instruction including at least one piece of signal path-specifying information for concurrent use for specifying the signal paths, the signal path-forming device forming the signal paths according to the signal path-specifying information.

Further preferably, the plurality of elementary arithmetic operation units have respective one-dimensional addresses peculiar thereto, and when one of the elementary arithmetic operation units is to receive an output signal from another one of the elementary arithmetic operation units, the signal path-specifying information specifies the another one of the elementary arithmetic operation units as a source of the output signal by using an address relative to one of the respective one-dimensional addresses which is assigned to the one of the elementary arithmetic operation units, which is to receive the output signal.

Preferably, numerical values constituting a cyclic sequence progression are employed for use as the respective one-dimensional addresses of the elementary arithmetic operation units, the respective one-dimensional addresses being assigned to the elementary arithmetic operation units in a predetermined order such that the elementary arithmetic operation units form a closed loop.

Preferably, the memory device stores in a time series manner at least two arithmetic operation control instructions, the signal path-forming device sequentially reading the arithmetic operation control instructions from the memory device.

Also preferably, the signal path-forming device sequentially executes the arithmetic operation control instructions in synchronism with a clock to form the signal paths.

Preferably, the elementary arithmetic operation units have respective two-dimensional addresses peculiar thereto, and when one of the elementary arithmetic operation units is to receive an output signal from another one of the elementary arithmetic operation units, the predetermined program specifies the another one of the elementary arithmetic operation units as a source of the output signal by using a two-dimensional address relative to one of the respective two-dimensional addresses which is assigned to the one of the elementary arithmetic operation units, which is to receive the output signal.

Preferably, the elementary arithmetic operation units are arranged in the form of a matrix.

Preferably, the elementary arithmetic operation units each have a selector to which are connected signal lines for forming signal paths, the signal path-forming device sending a command signal according to the predetermined program to the selector so as to cause the selector to select one of the signal lines.

More preferably, the signal path-forming device comprises a decoder for decoding the predetermined program, and sending the command signal to the selector according to the signal path-specifying information decoded from the predetermined program.

Preferably, the digital signal processor includes data transfer memory areas provided for the elementary arithmetic operation units, respectively, the signal path-forming device supplying the elementary arithmetic operation units with input data to the digital signal processor according to the predetermined program, each the elementary arithmetic operation units storing output data in an address of a corresponding one of the data transfer memory areas, which is determined according to the predetermined program.

To attain the above object, according to a second aspect of the invention, there is provided a storage medium storing a program for causing a digital signal processor having an arithmetic operation device to carry out digital signal processing, the arithmetic operation device including a plurality of elementary arithmetic operation units having an identical construction, the program comprising the steps of forming signal paths for inputting and outputting signals to and from the elementary arithmetic operation units, according to a predetermined program, causing the arithmetic operation device to carry out processing of a digital signal input to the digital signal processor after the signal paths have been formed.

Preferably, the program comprises at least one arithmetic operation control instruction including signal path-specifying information for specifying the signal paths.

The above and other objects, features, and advantages of the invention will become more apparent from the following detailed description taken in conjunction with the accompanying drawings.

BRIEF DESCRIPTION OF THE DRAWINGS

FIG. 5 is a diagram showing an example of a program for forming signal paths, which is provided for a certain elementary arithmetic operation unit of the DSP;

FIG. 12 is a diagram showing a format of a program executed by the DSP;

FIG. 15A is a diagram showing a second example of a program, which is executed by the DSP;

FIG. 16 is a diagram showing a third example of a program, which is executed by the DSP.

DETAILED DESCRIPTION

The invention will now be described in detail with reference to drawings showing embodiments thereof.

The following description is made only by way of example, but by no means intended to limit the scope of the invention. The invention can be modified and altered as desired without departing from the scope thereof.

Figure 1:
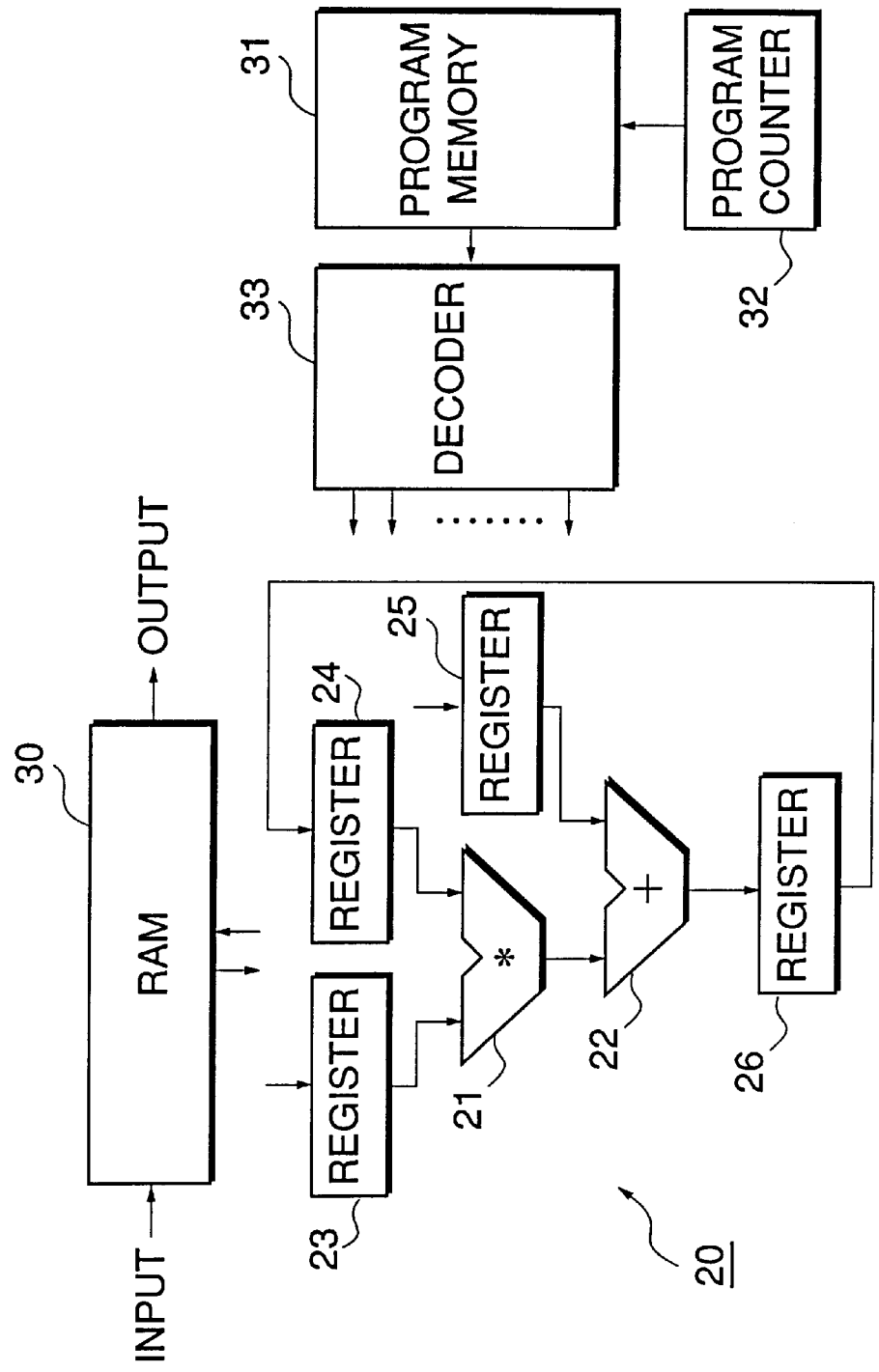
FIG. 1 is a diagram schematically showing a typical arrangement of a conventional digital signal processor (DSP)
Figure 2:
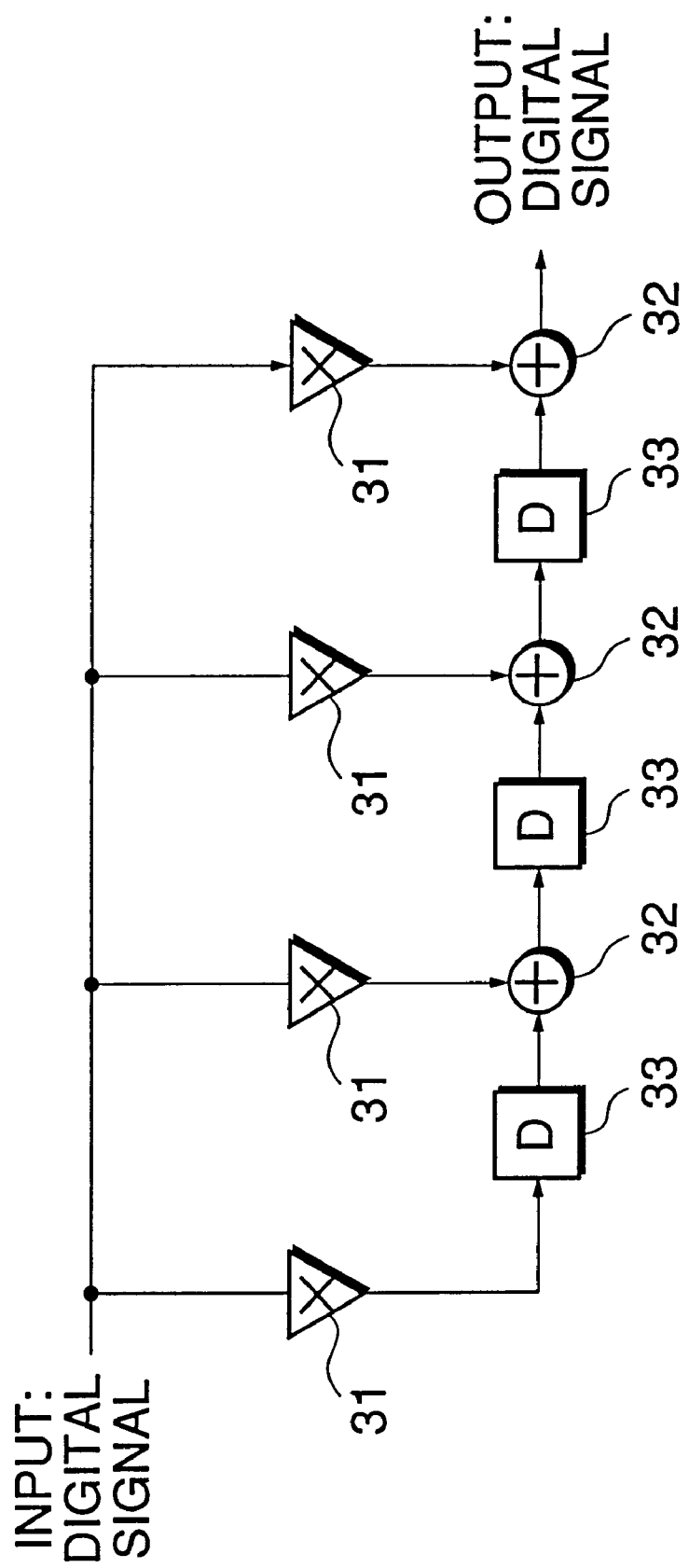
FIG. 2 is a diagram schematically showing the construction of a conventional transfer filter.
Figure 3:
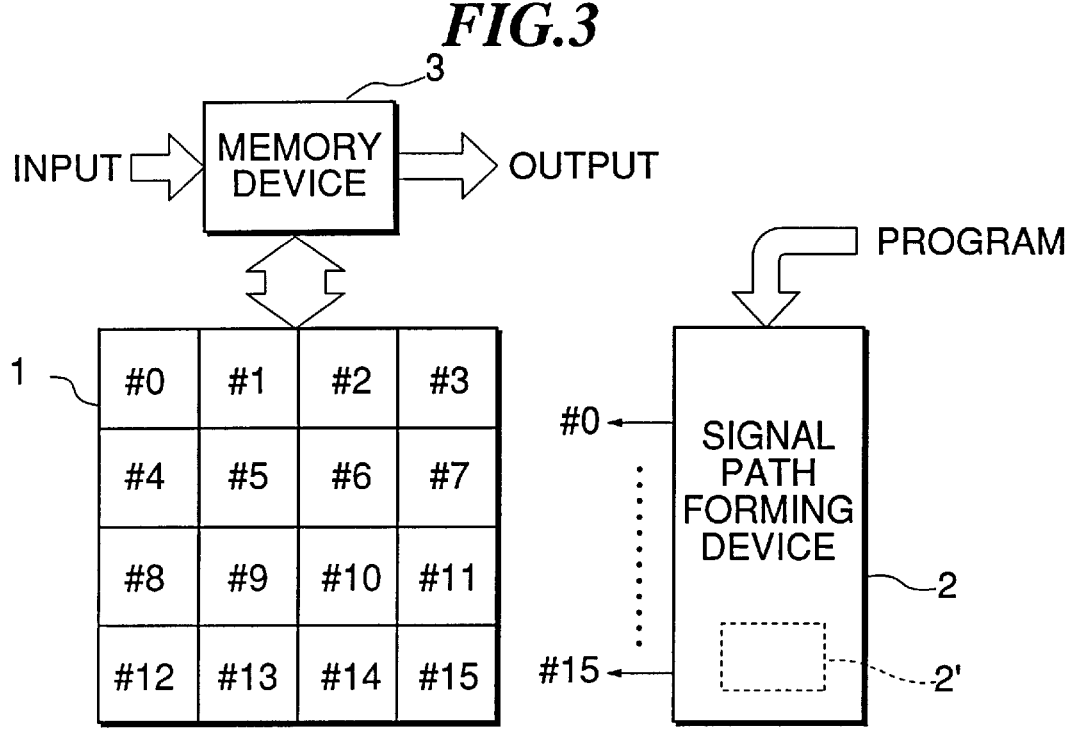
FIG. 3 is a block diagram schematically showing the whole arrangement of a DSP according to a first embodiment of the invention.

FIG. 3 shows the arrangement of a digital signal processor (DSP) according to a first embodiment of the invention. As shown in the figure, the DSP according to the first embodiment has an arithmetic operation unit array 1 formed of elementary arithmetic operation units #0 to #15 arranged in the form of a matrix. Each elementary arithmetic operation unit #k (k=0 to 15) occupies a two-dimensional address space within the arithmetic operation unit array 1, to which an address is assigned. The DSP also includes a signal path-forming device 2 for forming signal paths for transfer of data, and a memory device 3 formed of a RAM (random access memory) and a ROM (read only memory).

Figure 4:
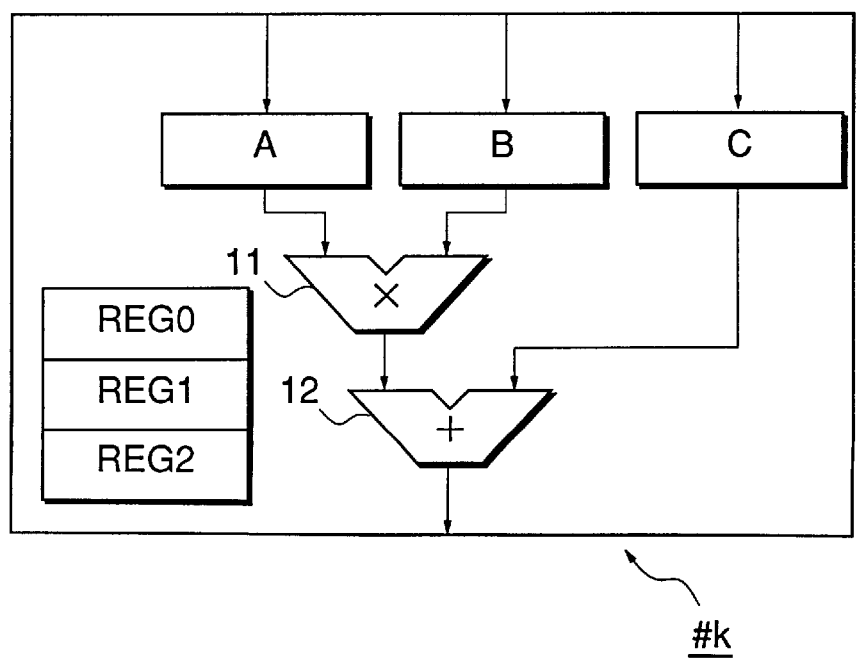
FIG. 4 is a diagram showing the construction of an elementary arithmetic operation unit of the DSP.

FIG. 4 shows the construction of an elementary arithmetic operation unit #k (k=0 to 15). In the illustrated example, the elementary arithmetic operation unit (hereinafter referred to as "the elementary unit") #k has a multiplier 11 and an adder 12 as arithmetic operation means. The multiplier 11 is provided with input registers A and B connected to inputs thereof, and the adder 12 is provided with an input register C connected to an input thereof. These input registers hold data supplied to the multiplier and adder. Further, the elementary unit #k contains three local registers REG0 to REG2 each of which is used for storing results of an arithmetic operation of the elementary unit #k, delaying a signal, and other purposes. The input registers A to C and the local registers REG0 to REG2 are supplied with clocks having a fixed frequency in synchronism with which writing of data into each register is carried out.

The signal path-forming device 2 includes a program memory 2'. The program memory 2' has a program previously written thereinto which defines signal paths required for carrying out digital signal processing, before the start of execution of the digital signal processing. According to the program, the signal path-forming device 2 forms signal paths connecting between elementary units and the memory device 3.

The signal paths formed by the signal path-forming device 2 are classified into the following types:

a. Signal paths connecting between registers of each elementary unit and data output terminals of other elementary units.

b. Signal paths connecting between registers of each elementary unit and the memory device 3.

c. Signal paths connecting between registers of each elementary unit to each other.

The program stored in the program memory provides information of the above-mentioned signal paths defined for each of the elementary units. FIG. 5 shows an example of a portion of a program of this kind, which is provided for an elementary unit #k.

For each register of the present elementary unit to receive output data from an elementary unit other than present elementary unit (data source elementary unit), it is required to form a signal path between the register of the present elementary unit and the data source elementary unit. In order to form such a signal path, it is required to designate an address of the data source elementary unit. In the present embodiment, as shown in FIG. 5, an elementary unit (data source elementary unit) from which a register (input register A in FIG. 5) of the present elementary unit receives output data is designated by a two-dimensional relative address relative to the two-dimensional address of the present arithmetic operation unit, e.g. by "m rows above and n columns leftward", by the program. For a register of the present arithmetic operation unit to receive data from the memory device 3, the program designates an address within the memory device 3 at which the data is stored. The signal path-forming device 2 forms signal paths based on such designations of addresses by the program.

Means for forming signal paths between elementary units or between the elementary units and the memory device 3 can be implemented in various forms. For example, such means are implemented by the following constructions:

a. Construction using selectors

A bundle of signal lines for transferring output data from elementary units and data read from the memory device 3 are formed so as to extend through each of the elementary units. Further, selectors are provided as prior stages to respective registers of each elementary unit. Each selector has a data input terminal connected to the bundle of signal lines and a signal line for transferring output data from the register of the elementary unit to which the selector belongs.

The signal path-forming device 2 supplies a selection signal to each selector of each elementary unit according to the program for forming signal paths to cause the selector to select one of signal lines connected to the registers. That is, the program contains information specifying a source of input data for each register of each elementary unit, and the signal path-forming device 2 generates a selection signal for each register based on the information, and delivers the selection signal to the corresponding selector to supply the input data to the register.

b. Construction using a memory

A data transfer memory device is provided within the DSP, and data transfer is effected by using the data transfer memory device in the following manner:

(1) A memory area within the data transfer memory device where output data is to be stored is provided for each elementary unit. Output data from each elementary unit is stored in one of the memory areas within the data transfer memory device, which is provided for the elementary unit.

(2) The signal path-forming device 2 operates on the program for forming signal paths to read data required by each input register of each elementary unit from the data transfer memory device and supply the same to the input register of the elementary unit. The address within the memory area where the data is stored is calculated based on the address of the elementary unit to which the input register for receiving the data belongs and a relative address of a data source elementary unit relative to the present elementary unit. As the relative address of the data source elementary unit, one defined for each register by the program is used.

It should be noted that instead of additionally providing a separate data transfer memory device as in the above example, a predetermined range of memory area within the memory device 3 may be used as the data transfer memory device.

(1) First example of operation of the DSP according to the present embodiment

Figure 6:
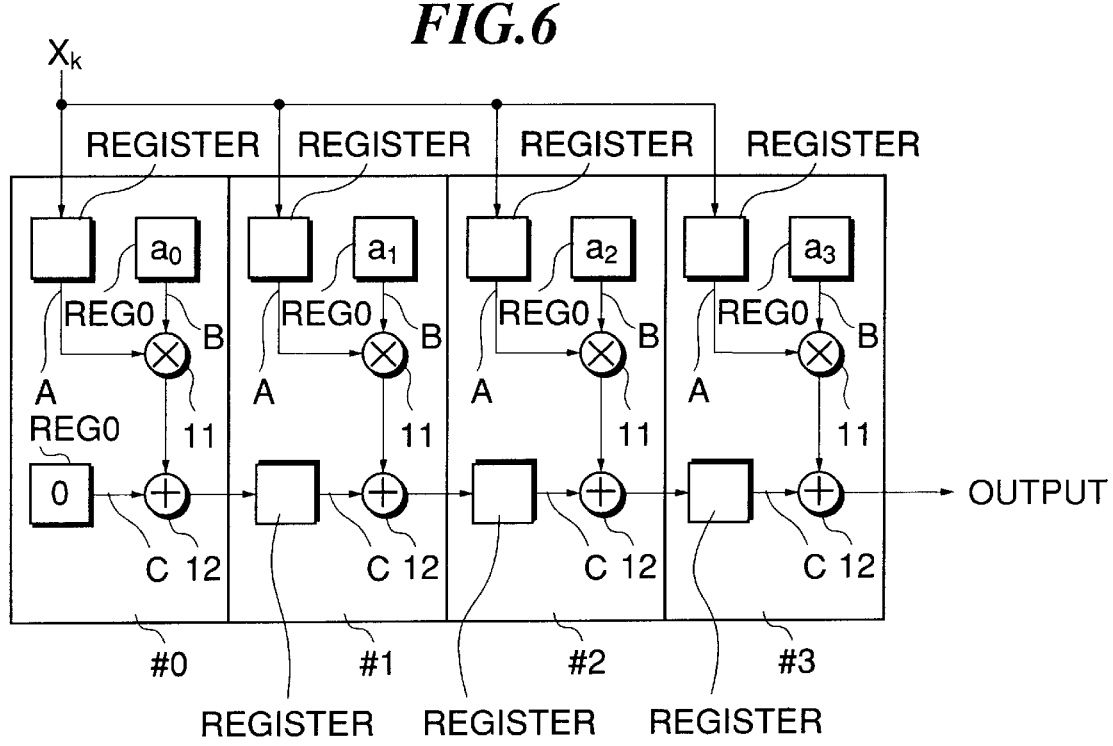
FIG. 6 is a diagram showing a first example of operation of the DSP.

FIG. 6 shows an example of application of the DSP of the present embodiment in which elementary units #0 to #3 are used to form a FIR filter. The FIR filter carries out convolution of a sequence of digital signal samples $x_k$ to $x_{k-3}$ (where $x_k$ represents the present sample, $x_{k-i}$ a sample i clocks before) with coefficients $a_0$ to $a_3$. In FIG. 6, component parts corresponding to those shown in FIG. 3 are designated by identical reference numerals. Further, to avoid complexity of the figure, the input registers A to C are shown merely by the corresponding symbols A to C attached to arrows indicative of flow of data.

To form such an FIR filter, a program is supplied to the signal path-forming device 2 to form signal paths in the following manner:

1) Elementary unit #0 i) Input register A is supplied with data read from the memory device 3.

ii) Input register B is supplied with output data from the local register REG0.

iii) Input register C is supplied with output data from the local register REG1.

iv) Local registers REG0 and REG1 are supplied with data read from the memory device 3.

2) Elementary unit #1 to #3 i) Input register A is supplied with data read from the memory device 3.

ii) Input register B is supplied with output data from the local register REG0.

iii) Input register C is supplied with output data from an elementary unit located one column leftward.

iv) Local register REG0 is supplied with data read from the memory device 3.

Thus, a program with the same contents can be used for the elementary units #1 to #3. Therefore, the user has only to prepare a program corresponding to a single elementary unit, and copy the program to prepare programs for the other elementary units.

To carry out the filtering operation, the coefficients $a_0$ to $a_3$ are read from the memory device 3 in advance, and set to local registers within the elementary units, which are specified by the program. In this manner, the FIR filter shown in FIG. 6 is completed. Then, the filtering operation is carried out on a sequence of samples $x_k$ supplied to the FIR filter. The multiplication and addition constituting the filtering operation are executed in parallel by the multiplier and adder of each elementary unit. Thus, the filtering operation can be carried out at a very high speed.

(2) Second example of operation of the DSP according to the present embodiment.

Figure 7:
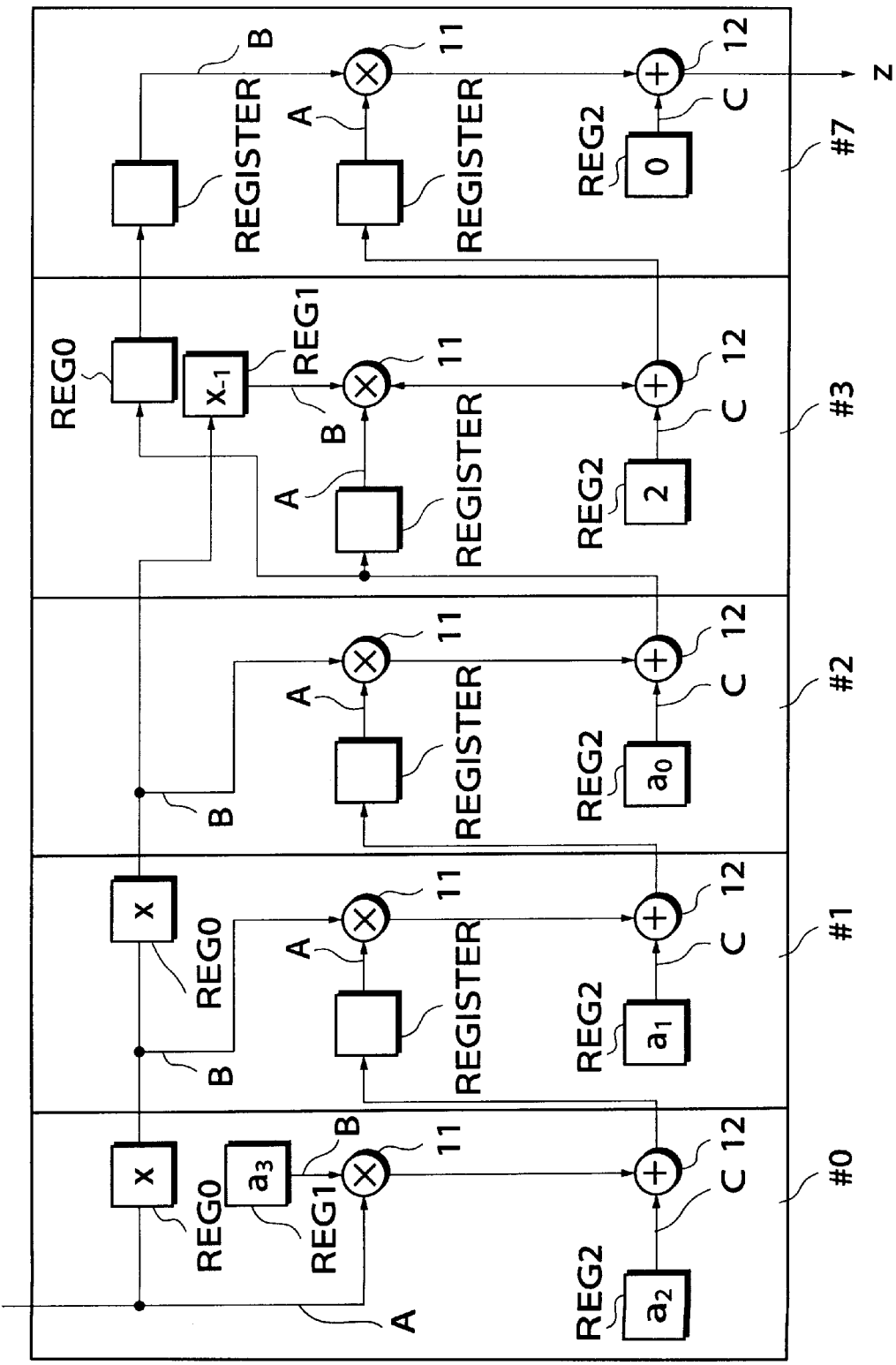
FIG. 7 is a diagram showing a second example of operation of the DSP.

FIG. 7 shows an example of application of the DSP in which elementary units #0 to #3, and an elementary unit #7 one row below the units #0 to #3 are used to form an arithmetic circuit for calculating z=1/x.

A portion of the arithmetic circuit formed by the elementary units #0 to #2 serves as a calculator for calculating an initial value $x_0$ based on a sample x supplied from the memory device 3 by using the following formula (1):

$$x_0 = a_3 x^3 + a_2 x^2 + a_1 x + a_0 \quad (1)$$

As shown in FIG. 7, transfer of the sample x from one elementary unit to another is effected with one clock of delay by passing the sample x through a local register REG0. This is to make the transfer of the sample x timed to supply of output data from the adder 12 of each elementary unit to the multiplier 11 of the following elementary unit, which is delayed by one clock due to the presence of the input register C.

Then, a portion of the arithmetic circuit formed by the elementary units #3 and #7 serves as a calculator for calculating one-stage Newton approximation z by applying the initial value $x_0$ thus obtained to the following formula (2):

$$z = x_0(2 - x_0) \quad (2)$$

It should be noted that output data from the local register REG0 of the elementary unit #2 is delayed by the local register REG1 of the elementary unit #3 and then supplied to the multiplier 11 thereof. This is to supply the multiplier 11 of the elementary unit #3 with a sample x-1 one clock earlier than a sample x supplied to the multipliers 11 of the elementary units #0 to #2. To cause the DSP to carry out the calculation of the equation (2), it is only required to supply a sample $x_1 = -1$ to the elementary unit #0 before giving the sample x thereto. Based on samples supplied in this manner, the arithmetic circuit portion formed by the elementary units #3 and #7 carries out the calculation of the equation (2).

A program for obtaining the above arithmetic circuit can be prepared, similarly to the first example of operation of the DSP, by designating a source of data for each register of each elementary unit.

According to the first embodiment, as described above, by supplying a program for forming signal paths to the signal path-forming device 2, it is possible to form a desired digital signal processing circuit by a combination of elementary units. Further, in preparing the program, an elementary unit as a source of input data to be supplied to a register of another elementary unit can be designated by a two-dimensional relative address relative to the address of the latter elementary unit. As a result, the DSP according to the present embodiment is advantageous in that the contents of the program need not be changed depending on which of the elementary units are to be used to execute the digital signal processing (i.e. the program is relocatable).

Next, a second embodiment of the invention will be described.

Figure 8:
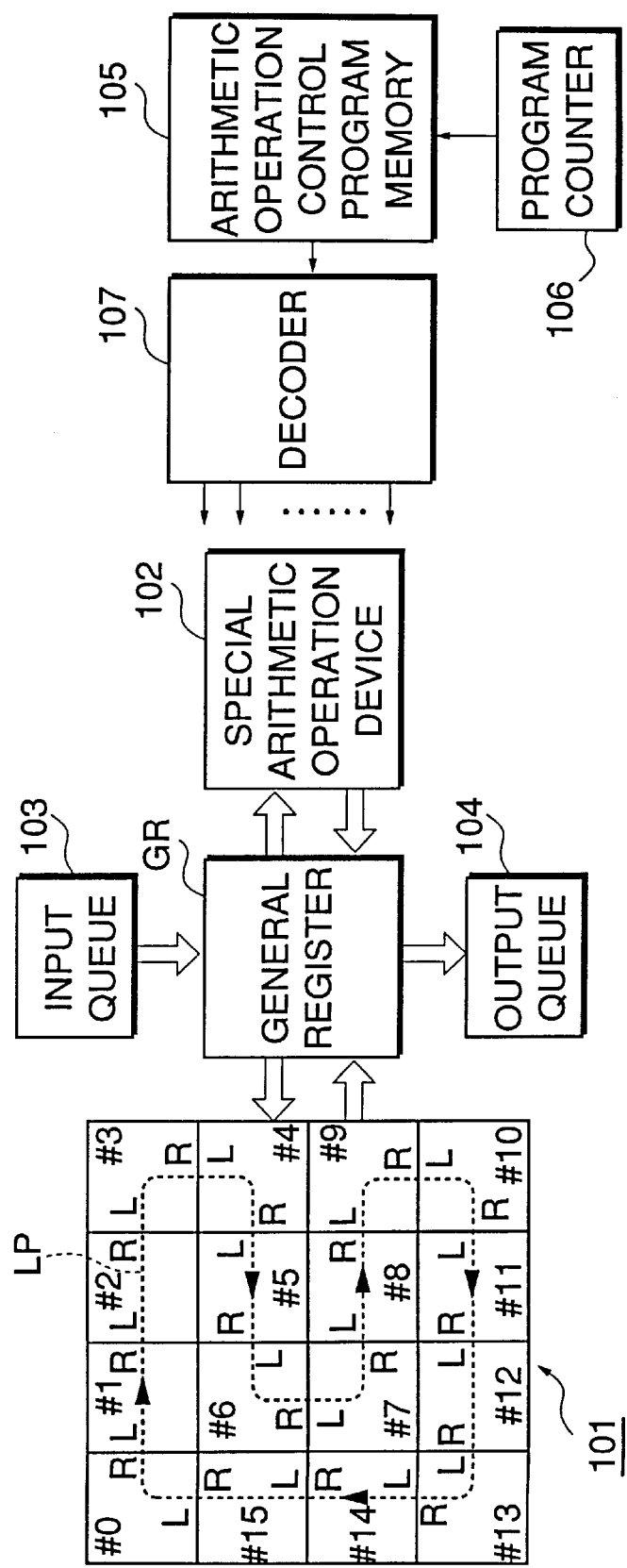
FIG. 8 is a diagram showing schematically showing the whole arrangement of a DSP according to a second embodiment of the invention.

FIG. 8 shows the arrangement of a digital signal processor (DSP) according to the second embodiment. In the figure, reference numeral 101 designates an arithmetic operation unit array 101 formed of elementary units #0 to #15 arranged in the form of a matrix as arithmetic operation means. The elementary units #k (k=0 to 15) are assigned with respective peculiar addresses k="0" to "15". As is distinct from the first embodiment, the address assignment of the elementary units #0 to #15 within the arithmetic operation unit array 101 is made such that as viewed in the order of the address numbers, the elementary units #0 to #15 form a closed loop LP. Details of the closed loop LP and the significance of the addresses "0" to "15" will be described hereinafter. The DSP according to the present embodiment has a special arithmetic operation device 102 as arithmetic operation means in addition to the arithmetic operation unit array 101. The special arithmetic operation device 102 performs special arithmetic operations other than multiplication and addition.

Reference numeral 103 designates an input queue which is formed by a plurality of FIFO's for receiving and accumulating data of input digital signals to be processed by the arithmetic operation means, such as the arithmetic operation unit array 101, while reference numeral 104 designates an output queue which is formed by a plurality of FIFO's for accumulating and sending data of output digital signals as results of arithmetic operations of the arithmetic operation means, such as the arithmetic operation unit array 101. Depending on the contents of the digital signal processing to be executed by the arithmetic operation unit array 101, it is required to supply a plurality of kinds of input digital signals to the arithmetic operation unit array 101, etc., or deliver a plurality of kinds of output digital signals from the arithmetic operation unit array 101 from the DSP. In such a case, the FIFO's of the input queue 103 receive and accumulate input digital signals required by the arithmetic operation unit array 101, while the FIFO's of the output queue 104 accumulate and deliver output digital signals as results of arithmetic operations by the arithmetic operation unit array 101.

A general register GR is provided for transfer of signals between the above-mentioned elements of the DSP according to the present embodiment. That is, each input digital signal to be processed is supplied via the input queue 103 and the general register GR to the arithmetic operation unit array 101, and each output digital signal as a result of processing by the arithmetic operation unit array 101 is delivered via the general register GR and the output queue 104 from the DSP. Further, inputting and outputting of a digital signal to and from the special arithmetic operation device 102 are also carried out by way of the general register GR. In the present embodiment, the general register GR is comprised of a plurality of general registers, and hereinafter individual general registers will be referred to as a general register GR0, a general register GR1, . . . etc.

Reference numeral 105 designates an arithmetic operation control program memory which stores a program given by the user. The program is formed of one or more arithmetic operation control instructions, which are formed by one or more pieces of signal path-specifying information for concurrent use. The signal path-specifying information is for specifying signal paths based on which an arithmetic circuit for carrying out digital signal processing desired by the user is formed by elements within the DSP. The signal path-specifying information is classified as follows:

a. Signal path-specifying information for specifying a signal path or paths to be formed within each elementary unit forming the arithmetic operation unit array 101.

b. Signal path-specifying information for specifying a signal path or paths to be formed between each elementary unit to another elementary unit.

c. Signal path-specifying information for specifying a signal path or paths to be formed between each elementary unit and the general register GR.

d. Signal path-specifying information for specifying a signal path or paths to be formed between the general register GR and each FIFO of the input queue 103 or the output queue 104.

Reference numeral 106 designates a program counter 106 for supplying readout addresses to the arithmetic operation control program memory 105. The supply of a readout address is carried out in one of the following manners:

a. When a program to be executed is formed of one arithmetic operation control instruction, a readout address for reading out the instruction is supplied form the program counter 106 to the arithmetic operation control program memory 105.

b. When a program to be executed is formed of two or more arithmetic operation control instructions, readout addresses for reading out the respective instructions are sequentially supplied from the program counter 106 to the arithmetic operation control program memory 105 in synchronism with a clock having a predetermined frequency.

c. Among programs, there is a type which includes an initializing instruction provided at the start thereof, which is executed only once for initialization of the DSP. In executing such a program, first, a readout address corresponding to the initializing instruction is sent to the arithmetic operation control program memory 105, and then a readout address corresponding to the following instruction is supplied to the same. If the following instruction is comprised of a plurality of instructions, following the sending of the readout address corresponding to the initializing instruction at the start of the program to the arithmetic operation control program memory 105, readout addresses corresponding to the respective following instructions are sequentially supplied to the arithmetic operation control program memory 105.

Reference numeral 107 designates a decoder for decoding each instruction read from the arithmetic operation control program memory 105, and delivers control signals for forming signal paths specified by signal path-specifying information contained in the instruction. Details of processing by the decoder 7 will be described hereinafter.

Figure 9:
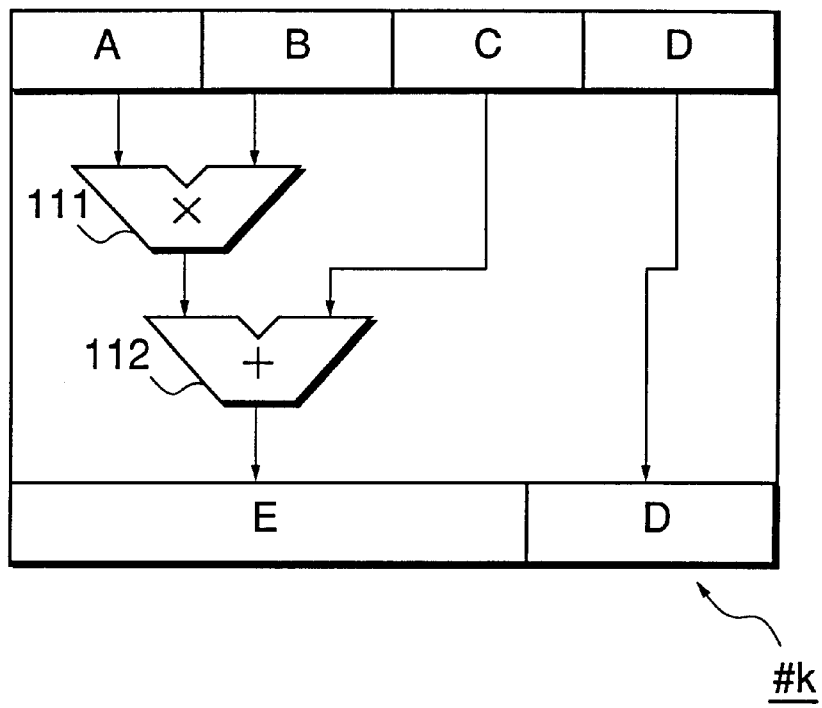
FIG. 9 is a diagram showing the construction of an elementary arithmetic operation unit of the DSP according to the second embodiment.

Next, the construction of an elementary unit #k (k=0 to 15) according to the present embodiment will be described with reference to FIG. 9. The elementary unit #k has a multiplier 111 and an adder 112 connected to each other as shown in the figure as arithmetic operation means. The multiplier 111 and the adder 112 are provided with registers A to C connected to inputs thereof for holding input signals supplied thereto, respectively. A register E is provided for the adder 112, which is connected to an output of the same. Further, the elementary unit #k has a register D for passing an input signal thereto after delaying the same. The registers A to E are supplied with a common clock having a predetermined frequency.

Figure 10:
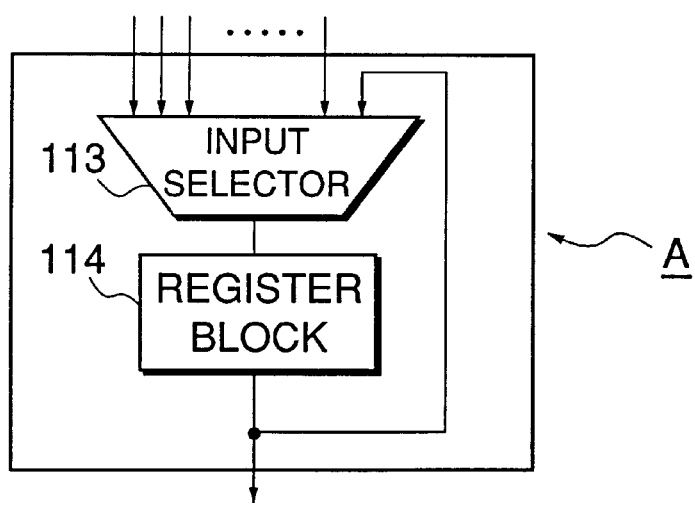
FIG. 10 is a diagram showing the construction of a register of the elementary arithmetic operation unit.

An example of construction of the register A is shown in FIG. 10. The other registers B to D have the same construction as that of the register A. As shown in the figure, the register A is formed of an input selector 113 and a register block 114. The input selector 113 is supplied with one of the following signals:

a. Output signal from the register block 114.

b. Output signals from registers E and D of one or more elementary units other than the present elementary unit #k to which the register A belongs.

c. Output signal(s) from one or more of the general registers GR0, GR1, . . .

The input selector 113 is supplied with a control signal from the decoder 107, which specifies a signal to be selected from the above signals a to c. The control signal is generated by the decoder as a result of decoding a piece of signal path-specifying information contained in the arithmetic operation control instruction, which corresponds to a register (register A in the present case) to which the input selector 113 belongs. The input selector 113 selects the signal specified by the control signal and delivers the same.

Figure 11:
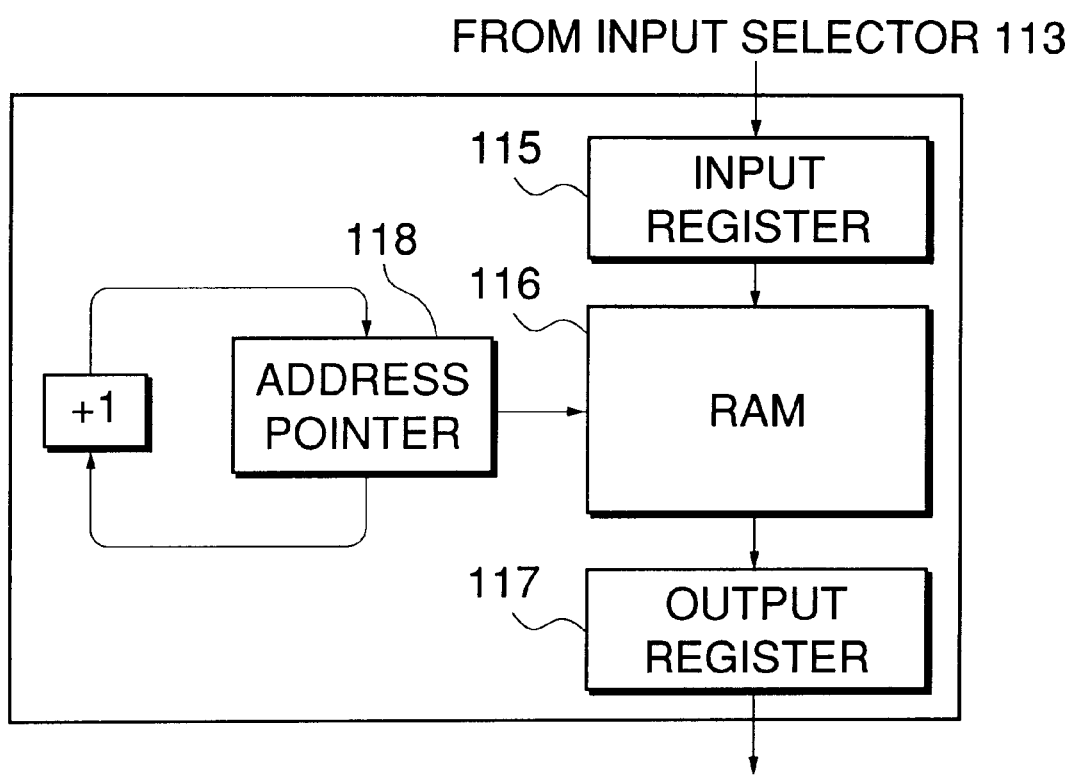
FIG. 11 is a diagram showing the construction of a register block appearing in FIG. 10.

The register block 114 holds and delivers the signal selected by the input selector 113, and is comprised of an input register 115, a RAM 116, an output register 117, and an address pointer 118, as shown in FIG. 11. The address pointer 118 is means for supplying a write address and a readout address to the RAM 116. The write address and the readout address are each incremented by one whenever the aforementioned clock is supplied to the register block 114, to repeatedly assume a predetermined range of values, e.g. a range of "0" to "n−1" in a cyclic manner. By supplying the write and readout addresses in this manner, time division multiplex control is carried out to hold a signal from the input selector 113 in the RAM 116 and read the held signal from the RAM 116. In other words, a signal delivered from the input selector 113 at one time point is written into the RAM 116 via the input register 115, and the written signal is delivered from the RAM 116 n clocks later by way of the output register 117.

The DSP according to the present embodiment is capable of forming a desired digital signal processing circuit by forming signal paths in the arithmetic operation unit array 101. To obtain a desired circuit configuration, it is required to determine signal path-specifying information for forming signal paths defining the desired circuit configuration, and prepare a program formed of arithmetic operation control instructions formed by the signal path-specifying information, and store the same in the arithmetic operation control program memory 105.

Now, a format of a program to be stored in the arithmetic operation control program memory 5 will be described with reference to FIG. 12 illustrating a table representative of contents of the program executed by the DSP of the present embodiment. More specifically, in the table, items "0", "1", . . . arranged in the uppermost row represent timing or a clock number. Table elements in a column below the item of "0" represent arithmetic operation control instructions to be executed at timing of generation of a "0th" clock, table elements in a column below the item of "1" represent arithmetic operation control instructions to be executed at timing of generation of a "1st" clock, and so forth. Each table element is signal path-specifying information specifying a source of an input signal to be supplied to a register the name of which is shown at a left end column in the same row as the table element. The contents of the signal path-specifying information are determined in the following manner:

First, as to a register which should hold or generate the present output signal as it is, information specifying the register itself is written into the arithmetic operation control program memory 105 as signal path-specifying information corresponding to the register. When this signal path-specifying information is decoded by the decoder 7, the input selector 113 (FIG. 10) within the register is supplied with a control signal for selecting the output signal from the register block 114 thereof so that the present output signal continues to be generated from the register block 114.

As to a register which should receive an output signal from any of the general registers GR0, GR1 . . . , information specifying the general register is written into the arithmetic operation control program memory 105 as signal path-specifying information corresponding to the register. When this signal path-specifying information is decoded by the decoder 107, the input selector 113 (FIG. 10) within the register is supplied with a control signal for selecting the output signal from the general register specified by the information.

When a source of an input signal to be supplied to a register is a register E or D of an elementary unit other than the present elementary unit to which the register belongs, it is required to specify the elementary unit other than the present elementary unit as well as the kind of the register E or D by signal path-specifying information. According to the present embodiment, the elementary unit to which the register E or D as the source of the input signal belongs is specified by a relative address relative to the address of the present elementary unit which should receive the signal.

More specifically, first, within the arithmetic operation unit array 1, a bundle of output signal lines for transferring data read from the registers D and E of the elementary units #0 to #15 are formed in a manner extending through the elementary units #0 to #15 along the closed loop LP shown in FIG. 8. Further, the bundle of output signal lines is connected to the input selectors 113 within the registers A to D of each elementary unit #0 to #15.

When an input selector 113 within a register of the elementary unit #k is to select an output signal from a register E or D of another elementary unit #m, first, the user determines a relative address of the elementary unit #m which designates on which side (left side or right side) of the elementary unit #k the elementary unit #m is located along the loop LP and the number of elementary units by which the elementary unit #m is separated from the elementary unit #k. Information specifying the determined relative address of the elementary unit #m and the kind of the register as the source of the output signal is stored as a program in the arithmetic operation control program memory 105. The signal path-specifying information thus programmed is then supplied to the decoder 107, which, based on the information specifying relative address of the elementary unit #m and the kind of the register as the source of the signal, generates a control signal for instructing selection of an output signal from the register of the elementary unit #m specified by the information and supplies the same to the input selector 113 within the register which should receive the output signal (FIG. 10).

The leftward (anticlockwise) and rightward (clockwise) directions along the loop LP with respect to each elementary unit are indicated by symbols "L" and "R in FIG. 8. In the illustrated example, the elementary unit #3, for example, is located at three elementary units rightward of the elementary unit #0. Therefore, when an output signal from a register within the elementary unit #3 is to be input to a register within the elementary unit #0, signal path-specifying information including a relative address of the elementary unit #3, which is specified by an expression "rightward by three elementary units", is formed. Further, the elementary unit #15 is located at one elementary unit leftward of the elementary unit #0. Therefore, when an output signal from a register within the elementary unit #15 is to be input to a register within the elementary unit #0, signal path-specifying information including a relative address of the elementary unit #15, which Is specified by an expression "leftward by one elementary unit", is formed.

In the conventional DSP's, arithmetic operations to be sequentially executed by an arithmetic operation block are programmed in time series. In this sense, programming by the conventional DSP's can be called "time-dependent programming".

In contrast, the DSP according to the present embodiment is capable of forming any desired arithmetic circuit by defining signal path-specifying information based on which arithmetic operation control instructions are generated, as described above. In this sense, it can be said that the DSP according to the present embodiment is capable of performing space-dependent programming. Further, according to the present embodiment, one program can be formed by a plurality of arithmetic operation control instructions, and in such a case, the instructions are sequentially executed. Therefore, time-dependent programming can be also performed by the DSP according to the present embodiment. Hereafter, an example of operation of the DSP based on a time-dependent program and an example of operation of the same based on a space-dependent program will be described.

(1) Example of operation of the DSP based on a time-dependent program

In this example, the elementary unit #0 carries out arithmetic operation of the following equation (3) over three clocks:

$$y = a_3 x^3 + a_2 x^2 + a_1 x + a_0 \qquad (3)$$

Figures 13, 14:
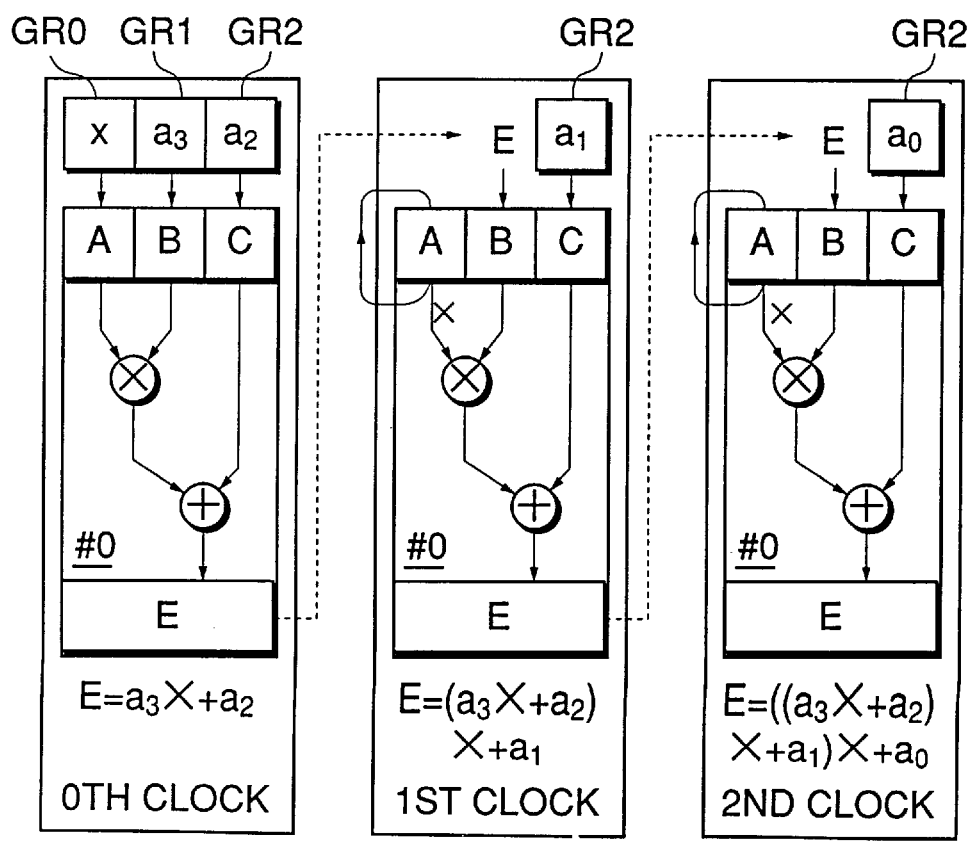
FIG. 13 is a diagram showing a first example of a program, which is executed by the DSP.
FIG. 14 is a diagram showing operations of the DSP executed according to the FIG. 13 program.

FIG. 13 shows a program for carrying out the arithmetic operation of the equation (3). In the table, items "0", "1", . . . arranged in the uppermost row represent timing or a clock number, and table elements in columns below the items "0", "1", "2" within the table represent signal path-specifying information each designated by a symbol indicative of the name of a register as a source of a signal or a symbol indicative of the name of signal per se. Indicated in the left end column are registers to which input signals are to be supplied. As shown in the figure, this program is formed by three arithmetic operation control instructions which are executed over three clocks. Hereafter, each arithmetic operation control instruction will be referred to e.g. as 0th clock instruction", and so forth, for the convenience of explanation. Further, in FIG. 13, "–" designates that the register corresponding to this symbol is not in use.

FIG. 14 shows changes in the state of the elementary unit #0 and the general registers GR0 to GR2 occurring as the three arithmetic operation control instructions are carried out. The state of the elementary unit #0 changes from left to right in the figure as a 0th clock instruction, a 1st clock instruction, and a 2nd clock instruction are sequentially carried out.

The above equation (3) can be transformed into the following equation (4):

$$y=((a_3x+a_2)x+a_1)x+a_0 \qquad (4)$$

In this example, arithmetic operations of the equation (4) are sequentially carried out starting with a portion enclosed by the innermost parenthesis toward a portion enclosed by the outermost parenthesis.

That is, first, the 0th clock instruction is executed to write an input digital signal x, a coefficient $a_3$, and a coefficient $a_2$ into the general registers GR0, GP1, and GR2, respectively. Output signals x, $a_3$ and $a_2$ from these general registers GR0, GR1, and GR2 are input to the registers A to C within the elementary unit #1, whereby results of an arithmetic operation corresponding to the portion enclosed by the innermost parenthesis of the equation (4), i.e. $a_3x+a_2$ are written into the resister E.

Then, the 1st clock instruction is executed to write a coefficient $a_1$ into the general register GR 2. Further, an output signal ($a_3x+a_2$) from the register E is written into the register B, while an output signal from the register A is written into the same register A again. As a result, an arithmetic operation corresponding to a portion enclosed by the second-innermost parenthesis of the equation (4), i.e. ($a_3x+a_2$)+$a_1$ is carried out by the elementary unit #0, and results of this arithmetic operation are written into the register E.

Then, the 2nd clock instruction is executed to write a coefficient a0 into the general register GR2. At the same time, an output signal ((a3x+a2)x+a1) from the register E is written into the register B, and the output signal from the register A is written into the same register A again. As a result, ultimate results of the arithmetic operations of the equation (4) are obtained by the elementary unit #0.

(2) Example of operation based on a space-dependent program.

FIG. 15A shows a program which is executed by the elementary units #0 to #2 to perform arithmetic operations of the above equation (4) over one clock. In the figure, signal path-specifying information corresponding to the register B of the elementary unit #1, for example, is expressed as "L(E)" which means a register E of an elementary unit located leftward of the present elementary unit by one elementary unit, that is, the information "L(E)" specifies the register E of the elementary unit #0 as a source of a signal. This is also the same with information "L(E)" for the elementary unit #2.

Figure 15B:
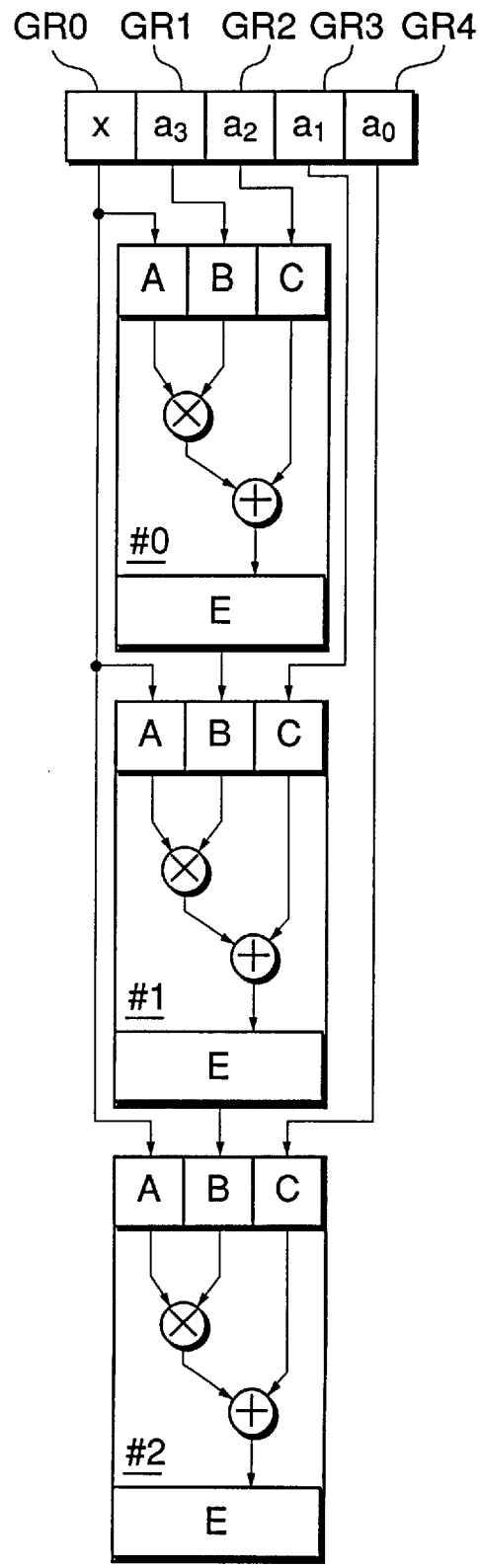
FIG. 15B is a diagram showing operations of the DSP executed according to the FIG. 15A program.

FIG. 15B shows a state of the DSP in which signal paths are formed between the elementary units #0 to #2 and the general registers GR0 to GR4 according to the FIG. 15A program (i.e. single arithmetic operation control instruction). It will be easily understood that this arrangement of the DSP can effect the arithmetic operations of the above equation (4).

FIG. 16 shows another program for carrying out the arithmetic operations of the above equation (4). In the FIG. 15A program described above, five general registers are used, whereas in this program, four general registers GR0 to GR3 are used. Further, according to this program, two arithmetic operation control instructions are used, and the first one of them is used for initialization of the DSP.

Figure 17A:
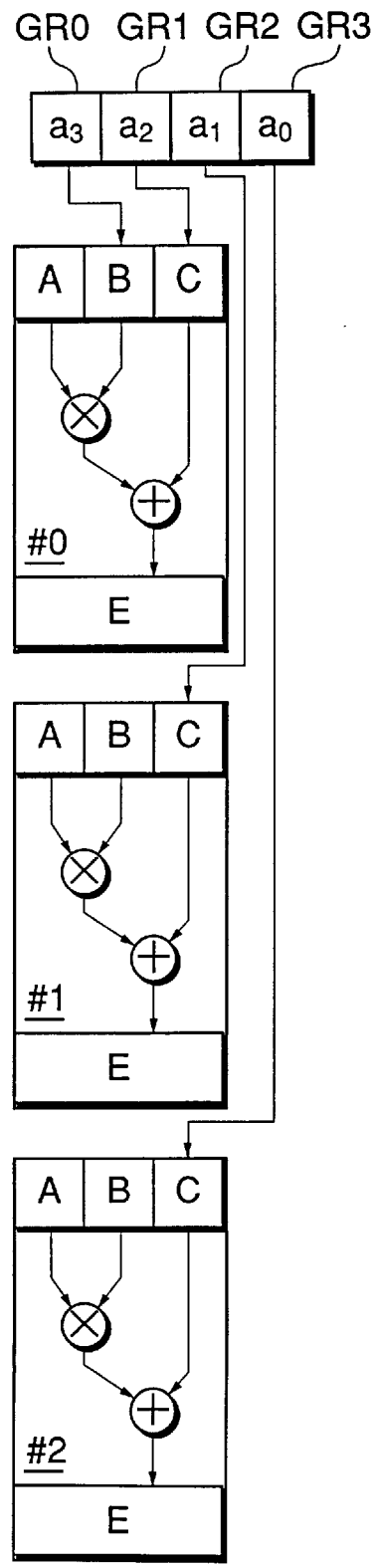
FIGS. 17A, 17B are diagrams showing operations of the DSP executed according to the FIG. 16 program.
Figure 17B:
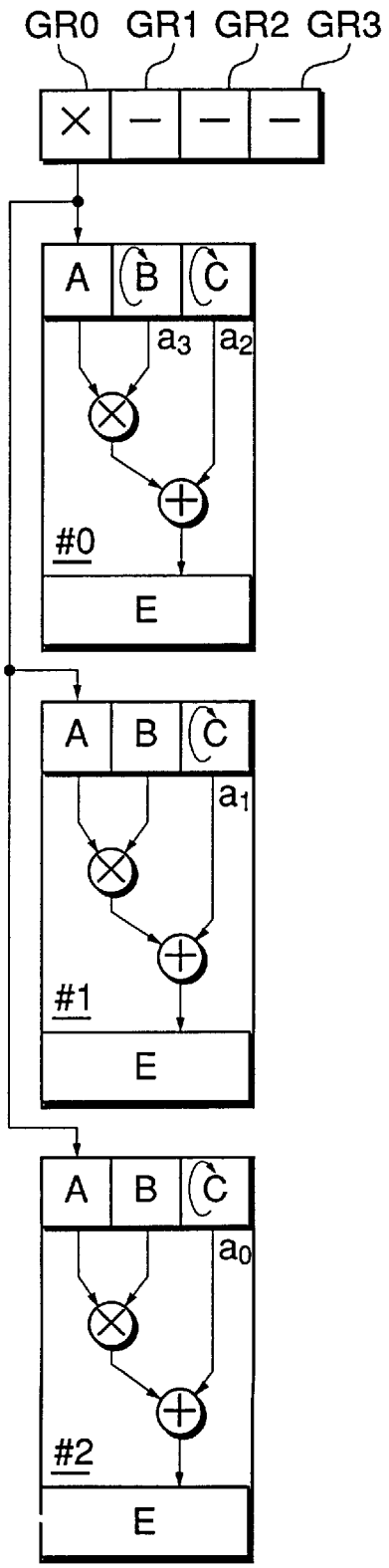

FIG. 17A shows a state of the DSP in which signal paths are formed between the elementary units #0 to #3 and the general registers GR0 to GR3 when the first arithmetic operation control instruction for initialization is executed. Further, FIG. 17B shows a state of the DSP in which signal paths are formed between the elementary units #0 to #3 and the general registers GR0 to GR3 when the following arithmetic operation control instruction is executed. Thus, the arithmetic circuits for carrying out the arithmetic calculations of the above equation (4) are formed by executing the two arithmetic operation control instructions.

In the above description of the second embodiment, simple examples of operations based on the time-dependent program and the space-dependent program have been given for simplicity of explanation. However, it goes without saying that a program which depends on both time and space, such as one the format of which is shown in FIG. 12 can be prepared for the DSP according to the present embodiment.

As described above, according to the second embodiment, it is possible to form a desired digital signal processing circuit as a combination of elementary units. Further, in preparing a program, an elementary unit as a source of an input signal to be supplied to a register of the present elementary unit can be designated by a relative address relative to the address of the present elementary unit. Therefore, the DSP according to the present embodiment is advantageous in that the contents of the program need not be changed depending on which elementary unit should execute an arithmetic operation (i.e. the program is relocatable).

Although in the above described embodiments, a program containing arithmetic operation control instructions including signal path-specifying information is stored in the program memory 2' of the signal path-forming device 2 (in the first embodiment) or the arithmetic operation control program memory 105 (in the second embodiment), for causing the digital signal processor to form signal paths and carry out arithmetic operations based on the signal paths, this is not limitative, but it goes without saying that the invention may be realized by a storage medium, such as a CD-ROM and a floppy disk, which stores a program for a digital signal processor to execute the same, particularly suitably when a data transfer memory device described in the first embodiment is employed as means for forming the signal lines.

What is claimed is:

1. A digital signal processor, comprising:
an arithmetic operation device that carries out arithmetic operations, said arithmetic operation device having a plurality of elementary arithmetic operation units having an identical construction, each of said elementary arithmetic operation units having a multiplier, an adder and registers;
a signal path-forming device that forms signal paths for inputting and outputting signals to and from said elementary arithmetic operation units, according to a predetermined program, wherein said predetermined program comprises an arithmetic operation control instruction including at least one piece of signal path-specifying information for concurrent use for specifying said signal paths, said signal path-forming device forming said signal paths according to said signal path-specifying information;
said arithmetic operation device carrying out processing of a digital signal input to said digital signal processor after said signal paths have been formed by said signal path-forming device;
a memory device that stores said predetermined program, wherein said signal path-forming device forms said signal paths according to said predetermined program stored in said memory device;

wherein said plurality of elementary arithmetic operation units have respective one-dimensional addresses peculiar thereto, and wherein when one of said elementary arithmetic operation units is to receive an output signal from another one of said elementary arithmetic operation units, said signal path-specifying information specifies said another one of said elementary arithmetic operation units as a source of said output signal by using an address relative to one of said respective one-dimensional addresses which is assigned to said one of said elementary arithmetic operation units, which is to receive said output signal.

2. A digital signal processor according to claim 1, wherein numerical values constituting a cyclic sequence progression are employed for use as said respective one-dimensional addresses of said elementary arithmetic operation units, said respective one-dimensional addresses being assigned to said elementary arithmetic operation units in a predetermined order such that said elementary arithmetic operation units form a closed loop.

3. A digital signal processor, comprising:

an arithmetic operation device that carries out arithmetic operations, said arithmetic operation device having a plurality of elementary arithmetic operation units having an identical construction, each of said elementary arithmetic operation units having a multiplier, an adder and registers;

a signal path-forming device that forms signal paths for inputting and outputting signals to and from said elementary arithmetic operation units, according to a predetermined program;

said arithmetic operation device carrying out processing of a digital signal input to said digital signal processor after said signal paths have been formed by said signal path-forming device;

wherein said elementary arithmetic operation units have respective two-dimensional addresses peculiar thereto, and wherein when one of said elementary arithmetic operation units is to receive an output signal from another one of said elementary arithmetic operation units, said predetermined program specifies said another one of said elementary arithmetic operation units as a source of said output signal by using a two-dimensional address relative to one of said respective two-dimensional addresses which is assigned to said one of said elementary arithmetic operation units, which is to receive said output signal.

4. A storage medium storing a program for causing a digital signal processor having an arithmetic operation device to carry out digital signal processing, said arithmetic operation device including a plurality of elementary arithmetic operation units having an identical construction and respective one-dimensional addresses peculiar thereto, said program comprising the steps of:

forming signal paths for inputting and outputting signals to and from said elementary arithmetic operation units, according to a predetermined program;

causing said arithmetic operation device to carry out processing of a digital signal input to said digital signal processor after said signal paths have been formed; and causing a signal path-specifying information, when one of said elementary arithmetic operation units is to receive an output signal from another one of said elementary arithmetic operation units, to specify said another one of said elementary arithmetic operation units as a source of said output signal by using an address relative to one of said respective one-dimensional addresses which is assigned to said one of said elementary arithmetic operation units, which is to receive said output signal.

5. A storage medium according to claim 4, wherein said program comprises at least one arithmetic operation control instruction including signal path-specifying information for specifying said signal paths.

6. A storage medium storing a program according to claim 4, said program further comprising the steps of:

employing numerical values constituting a cyclic sequence progression for use as said respective one-dimensional addresses of said elementary arithmetic operation units;

assigning said respective one-dimensional addresses to said elementary arithmetic operation units in a predetermined order such that said elementary arithmetic operation units form a closed loop.

7. A storage medium storing a program for causing a digital signal processor having an arithmetic operation device to carry out digital signal processing, said arithmetic operation device including a plurality of elementary arithmetic operation units having an identical construction and respective two-dimensional addresses peculiar thereto, said program comprising the steps of:

forming signal paths for inputting and outputting signals to and from said elementary arithmetic operation units, according to a predetermined program;

causing said arithmetic operation device to carry out processing of a digital signal input to said digital signal processor after said signal paths have been formed; and causing said predetermined program, when one of said elementary arithmetic operation units is to receive an output signal from another one of said elementary arithmetic operation units, to specify said another one of said elementary arithmetic operation units as a source of said output signal by using a two-dimensional address relative to one of said respective two-dimensional addresses which is assigned to said one of said elementary arithmetic operation units, which is to receive said output signal.

* * * * *